J. F. COCOWITCH.
SPRING WHEEL.
APPLICATION FILED SEPT. 21, 1910.
1,034,980.
Patented Aug. 6, 1912.
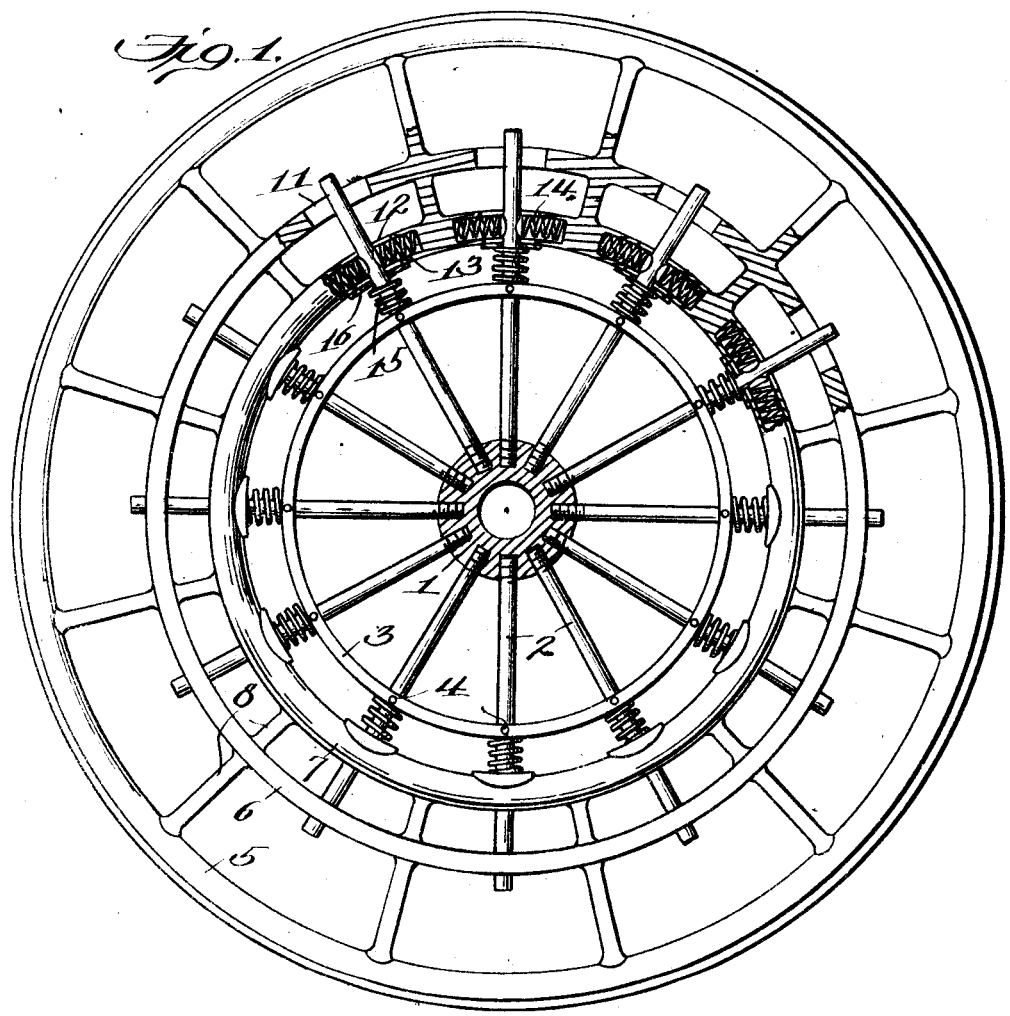
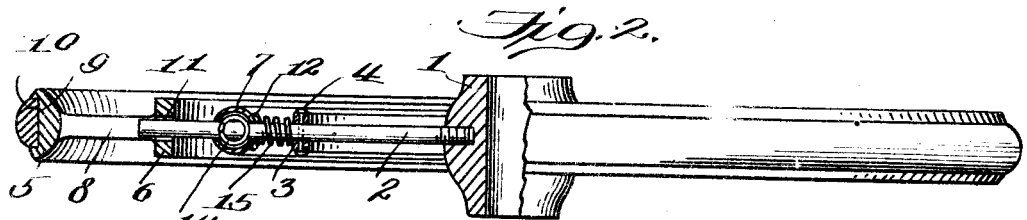
Witnesses:
Inventor
John F. Cocowitch

UNITED STATES PATENT OFFICE.

JOHN F. COCOWITCH, OF DUNNELLON, FLORIDA, ASSIGNOR OF ONE-HALF TO JAMES G. BASKIN, OF DUNNELLON, FLORIDA.

SPRING-WHEEL.

1,034,980.  Specification of Letters Patent.  Patented Aug. 6, 1912.

Application filed September 21, 1910. Serial No. 583,054.

*To all whom it may concern:*

Be it known that I, JOHN F. COCOWITCH, a citizen of the United States, residing at Dunnellon, in the county of Marion and State of Florida, have invented new and useful Improvements in Spring-Wheels, of which the following is a specification.

The present invention has reference to improvements in spring wheels for vehicles, and it comprehends generally the production of a vehicle wheel of maximum strength and durability wherein the desired resiliency is obtained solely through the employment of specially arranged coil springs.

It further comprehends the employment of a particular form of rim section which is composed of a plurality of connected concentric rings, certain of these rings being so constructed as to constitute guides for the spokes and a support for one series of springs.

A structural embodiment of the invention is illustrated in the accompanying drawing, wherein—

Figure 1 is a face view, and Fig. 2 an edge view of the improved wheel, each view being partly in section and partly in elevation.

In said drawings, 1 indicates in a general manner the hub of the wheel, and 2 the radial spokes, the latter having their inner ends securely fastened in sockets formed in the hub. Intermediate their ends, the spokes are secured to an annular band 3 provided with openings through which the spokes pass, the fastening devices being in the form of bolts 4 or the like, as shown.

The rim section of the wheel is of special construction, as originally stated, and consists of three concentric rings 5, 6 and 7, connected by radial braces 8. This element is preferably constructed of metal, and is in the form of a single casting. The outermost ring 5 constitutes the rim proper, and is provided with a continuous peripheral groove 9 wherein the solid tire 10 is fitted, the tire itself being either of rubber or metal, according to the character of the vehicle to which the wheel is to be attached. The two inner rings 6 and 7 are formed, respectively, with longitudinal series of slots 11 and 12, the slots in said rings being disposed in radial alinement to permit the extension of the outer portions of the spokes therethrough. The terminals of said spokes project but a very slight distance through the slots 11 and are wholly devoid of connection with the rim proper 5. The innermost ring 7 has a substantially circular cross-sectional shape, as shown in Fig. 2, and is further provided with a series of pairs of sockets 13 which are disposed interiorly thereof and open into the ends of the slots 12. These sockets constitute seats wherein the inner ends of pairs of expansible coil springs 14 are received, the outer ends of the springs bearing against the spokes at diametrically opposite points and serving to maintain said spokes normally central of slots 12 and 11. Said slots are arranged midway of the spaces between adjacent braces. Between the innermost ring 7 and the band 3 there is interposed a series of supporting springs 15 which are likewise preferably of helical construction and are expansible. The inner ends of this series of springs bear against the band, and the outer ends against a series of plates 16 slidable upon the spokes and held by the pressure of said springs against the inner face of ring 7, so as to close the adjacent ends of the slots 12. The arrangement of the several parts of the wheel is such, therefore, that the rim section, as a whole, is supported primarily by the band 3 and the adjacent series of springs 15, the latter affording the desired resiliency, as will be understood. The springs 14 bear against the spokes and serve to normally prevent lateral movement of the same, said springs being held against accidental displacement partly by the plates 16 and partly by the outer walls of their sockets, the diameters of the sockets being somewhat greater than the widths of the slots; the springs will yield, however, when the wheel is under tension, and permit movement of the spokes toward one end or the other of the slots.

The construction of the rim section as a single casting obviously results in its possessing great strength and durability, and also in the reduction of its cost of manufacture to a considerable extent.

I claim as my invention:

A spring wheel comprising, in combination, a rim section consisting of three rigidly connected concentric rings, the inner of which has a substantially-circular cross-sectional shape and is provided with a series of pairs of interiorly-located sockets;

said inner ring and the central ring being formed with radially-alining longitudinal slots, said sockets opening into the opposite ends of the slots in said inner ring; a hub; a series of spokes radiating from said hub and secured thereto at their inner ends, the outer end portions of said spokes projecting loosely through the slots in said inner and central rings, for endwise and lateral movement; pairs of springs disposed in said sockets and bearing at diametrically-opposite points against said spokes for yieldingly holding the same against lateral movement; an annular band secured to said spokes between said hub and said inner ring and arranged concentrically therewith; a series of supporting springs encircling said spokes and interposed between said band and said inner ring; and a tire fitted upon the outer ring of said rim section.

In testimony whereof I have hereunto set my hand in presence of two subscribing witnesses.

JOHN F. COCOWITCH.

Witnesses:
CHARLES A. ROWE,
JAMES G. BASKIN.